(12) United States Patent
Rodriguez et al.

(10) Patent No.: US 10,855,392 B2
(45) Date of Patent: Dec. 1, 2020

(54) HIGH-DENSITY SUBMARINE ROADM UNIT WITH REMOTE WSS REDUNDANCY

(71) Applicant: NEC Laboratories America, Inc., Princeton, NJ (US)

(72) Inventors: Eduardo Mateo Rodriguez, Tokyo (JP); Ryuji Aida, Tokyo (JP); Takehiro Nakano, Tokyo (JP)

(73) Assignee: NEC CORPORATION

( * ) Notice: Subject to any disclaimer, the term of this patent is extended or adjusted under 35 U.S.C. 154(b) by 0 days.

(21) Appl. No.: 16/681,813

(22) Filed: Nov. 12, 2019

(65) Prior Publication Data

US 2020/0153532 A1  May 14, 2020

Related U.S. Application Data

(60) Provisional application No. 62/767,174, filed on Nov. 14, 2018.

(51) Int. Cl.

| | |
|---|---|
| H04J 14/02 | (2006.01) |
| H04B 10/80 | (2013.01) |
| H04B 10/03 | (2013.01) |
| H04Q 11/00 | (2006.01) |
| G02B 6/293 | (2006.01) |
| G02B 6/35 | (2006.01) |
| H04B 10/11 | (2013.01) |
| H04B 13/02 | (2006.01) |

(52) U.S. Cl.
CPC ........ *H04J 14/0212* (2013.01); *G02B 6/293* (2013.01); *G02B 6/3594* (2013.01); *H04B 10/03* (2013.01); *H04B 10/11* (2013.01); *H04B 10/80* (2013.01); *H04B 13/02* (2013.01); *H04J 14/0293* (2013.01); *H04Q 11/0066* (2013.01); *H04Q 2011/0081* (2013.01); *H04Q 2011/0088* (2013.01)

(58) Field of Classification Search
None
See application file for complete search history.

(56) References Cited

U.S. PATENT DOCUMENTS

| | | | |
|---|---|---|---|
| 2003/0151521 A1* | 8/2003 | Horinouchi | .......... H04B 10/806 340/850 |
| 2017/0117982 A1* | 4/2017 | Ji | ....................... H04J 14/0212 |

OTHER PUBLICATIONS

Sorin Tibuleac, "ROADM network design issues", ADVA Optical Networking, ResearchGate, Dec. 9, 2014 (Retrieved on Feb. 6, 2020), URL: https://www.researchgate.net/publication/224490738_ROADM_network_design_issues (See pp. 2-53).

* cited by examiner

*Primary Examiner* — David W Lambert
(74) *Attorney, Agent, or Firm* — Joseph Kolodka

(57) ABSTRACT

Aspects of the present disclosure describe systems, methods and structures including high-density submarine/undersea reconfigurable optical add/drop multiplexers (ROADM) having remote wavelength selective switch (WSS) redundancy.

1 Claim, 4 Drawing Sheets

HIGH-DENSITY SUBMARINE ROADM UNIT WITH REMOTE WSS REDUNDANCY

CROSS REFERENCE TO RELATED APPLICATIONS

This application claims the benefit of Untied States Provisional Patent Application Ser. No. 62/767,174 filed 14 Nov. 2018 the entire contents of which is incorporated by reference as if set forth at length herein.

TECHNICAL FIELD

This disclosure relates generally to submarine optical communications and more particularly to submarine optical communications systems including a high-density submarine reconfigurable optical add-drop multiplexer (ROADM) and wavelength selective switch (WSS) redundancy.

BACKGROUND

As is known in the optical communications arts—and in particular the submarine/undersea optical communications art—branching units including ROADMs are fundamentally important components in such submarine/undersea systems. Known further, submarine/undersea systems having ROADMs based on WSS elements have proven to be of further importance as they provide great flexibility and reliability for the interconnection of three or more sites. Given their importance, improvements in such branching elements including ROADMs and WSS' would be a welcome addition to the art.

SUMMARY

An advance in the art is made according to aspects of the present disclosure directed to improved systems, methods, and structures including high-density submarine/undersea reconfigurable optical add/drop multiplexers (ROADM) having remote wavelength selective switch (WSS) redundancy.

In sharp contrast to the prior art, systems, methods, and structures according to aspects of the present disclosure advantageously employ remote WSS that are advantageously located in "dry plant", while the submarine/undersea ROADM include WSS in "wet plant".

As we shall now show and describe however, systems, methods, and structures according to the present disclosure advantageously overcome such space limitations of submarine/undersea ROADM units by employing a remote redundancy configuration for WSS elements. Advantageously, and according to an aspect of the present disclosure, redundant elements normally located inside an RU can be reduced and the number of RSUs can be doubled.

According to a further aspect of the present disclosure, submarine/undersea RSUs advantageously do not include redundant WSS elements. Instead, a system to traffic recovery methodology employing a WSS unit at a branch station is employed that may both increase the volume of add/drop operations at a particular ROADM while enhancing its serviceability.

BRIEF DESCRIPTION OF THE DRAWING

A more complete understanding of the present disclosure may be realized by reference to the accompanying drawing in which.

Figure 1:
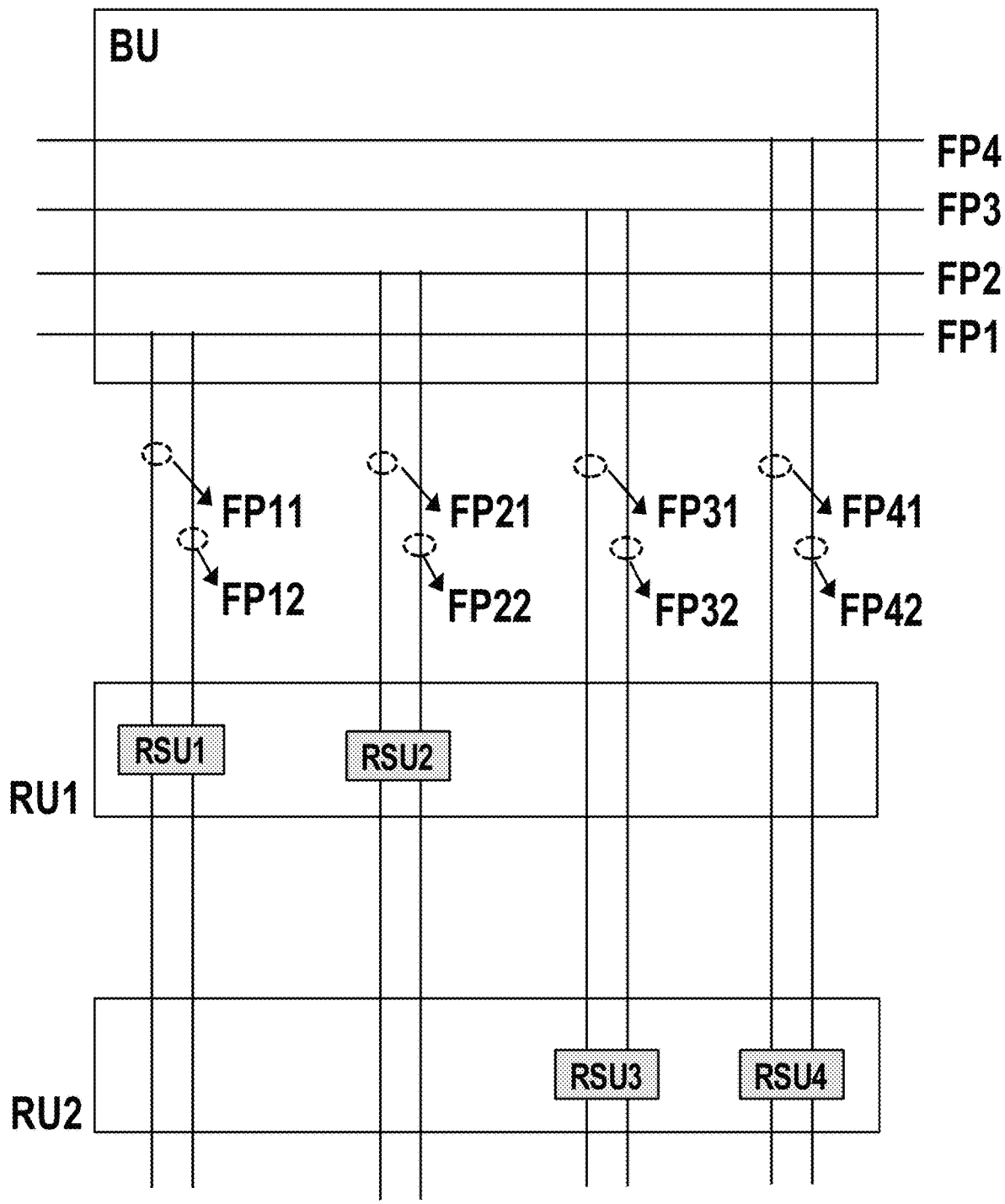
FIG. 1 shows a schematic diagram of an illustrative configuration of submarine/undersea branching unit(s) (BU) and submarine/undersea ROADM units (RU) wherein each RI includes ROADM subunits (RSU) and RU1 and RU2 are separate wet-plant bodies, spaced apart by a distance of several kilometers (km)—according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting once more that branching units including ROADMs are fundamental elements in modern submarine/undersea communications systems. As will be known and appreciated by those skilled in the art, ROADMs employing wavelength selective switch (WSS) elements provide considerable flexibility and reliability when used to interconnect three or more sites.

In submarine/undersea network systems, those skilled in the art will know that it is commonplace to divide the network into "trunks" and "branches". Typically, each branch station is connected to a pair of trunk stations by two independent fiber pairs (FPs). An amount of capacity that is added/dropped to each branch station is managed by the submarine/undersea ROADM unit (RU).

As will be known further by those skilled in the art, submarine/undersea RUs can accommodate a limited number and resulting volume of components due to the significant space/volume limitations of submarine/undersea bodies. Among the components included in an undersea/submarine RU include—among others—WSS elements, optical amplifiers, optical switches, passive optical couplers, control circuits, and command receivers and transmitters. Additionally—to increase overall reliability, certain elements included in the RU—such as the WSS—are redundant. Consequently, such RU space limitation result in a limited amount of add/drop operations that can be performed in the RU. For example, a typical submarine/undersea RU can support up to 2 add/drop operations in one housing (i.e., 2 ROADM sub-units). This means that full bi-directional connectivity is provided for 2 trunk FPs and 4 branch FPs. In those situations where it is necessary in a particular branch to drop more fiber pairs, several RUs must be installed.

FIG. 1 shows a schematic diagram of an illustrative configuration of submarine/undersea branching unit(s) (BU) and submarine ROADM units (RU) wherein each RI includes ROADM subunits (RSU) and RU1 and RU2 are separate wet-plant bodies, spaced apart by a distance of several kilometers (km). As illustrated in that configuration shown in the figure, 4 trunk FPs are shown with bidirectional add/drop connectivity. As may be now readily understood and appreciated—due to housing size limitation(s)—two cascaded RUs are necessarily employed. Additionally, each RSU includes redundant WSS elements to increase network reliability. Of course, such redundancy comes at a price—namely additional space in the submarine/undersea housing—which we have already noted is at a premium in such submarine/undersea systems.

As we shall now show and describe however, systems, methods, and structures according to the present disclosure advantageously overcome such space limitations of submarine/undersea ROADM units by employing a remote redundancy configuration for WSS elements. Advantageously, and according to an aspect of the present disclosure, redundant elements normally located inside an RU can be reduced and the number of RSUs can be doubled. According to a further aspect of the present disclosure, RSUs advantageously do not include redundant WSS elements. Instead, a system to traffic recovery methodology employing a WSS unit at a branch station is employed. Such high-density ROADM unit (HD-RU) employing aspects of the present is shown illustratively in FIG. 2.

Figure 2:
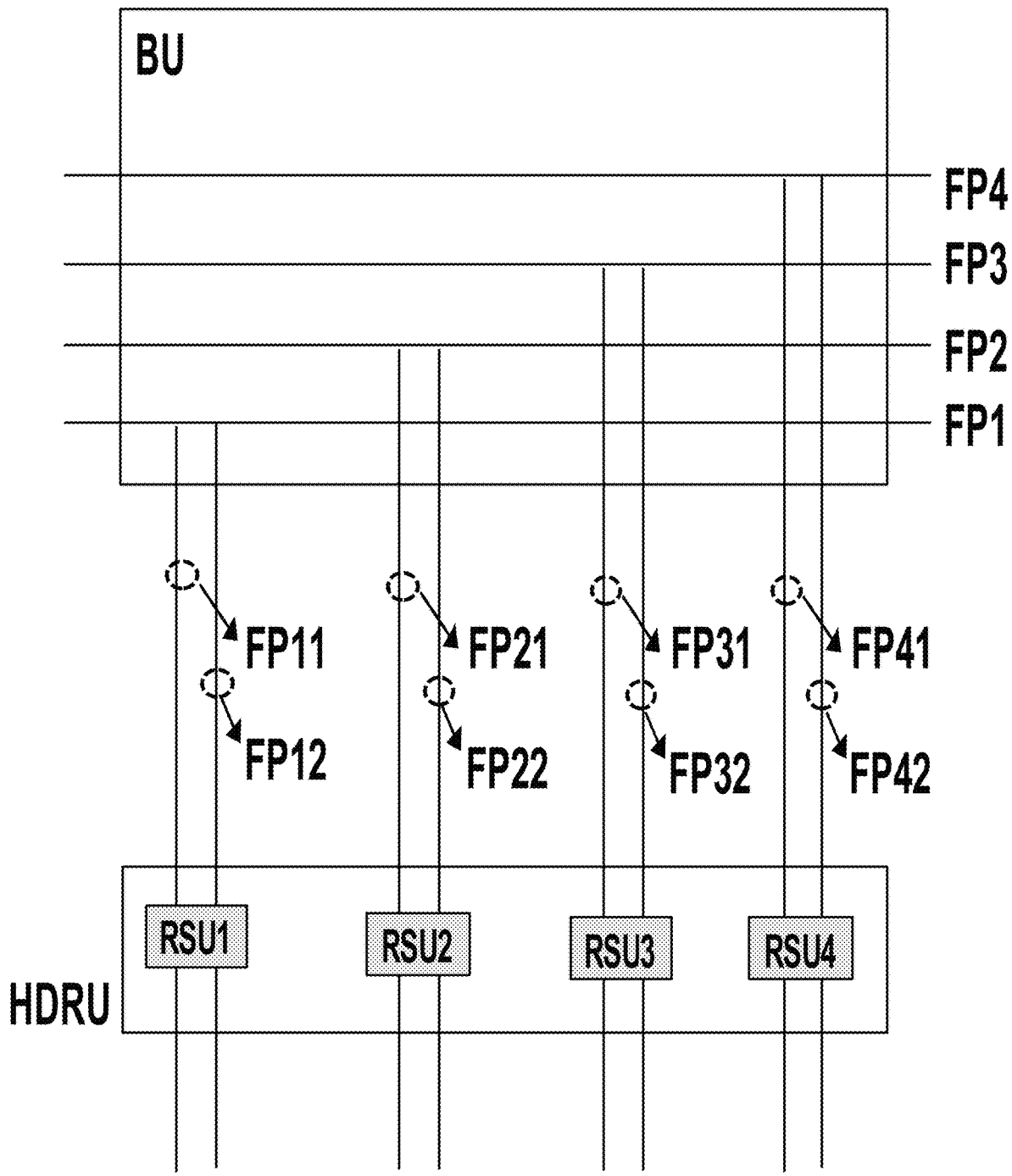
FIG. 2 shows a schematic diagram of an illustrative high-density ROADM unit (HDRU) according to aspects of the present disclosure.

With reference now to that FIG. 2, there it shows a schematic diagram of an illustrative high-density ROADM unit (HDRU) according to aspects of the present disclosure. As will be readily understood and appreciated by those skilled in the art, the reduction of RUs in submarine/undersea—as accomplished by systems, methods, and structures according to aspects of the present disclosure—is critically important as such RU reduction further reduces cost and simplifies marine installation and recovery of such systems.

As may be observed from FIG. 2, the illustrative configuration shown includes a BU and submarine/undersea HDRU including a plurality (in this illustrative example, four (4)) RSUs (RSU1, RSU2, RSU3, RSU4) optically interconnected by a plurality of FPs (FP11, FP12, FP21, FP22, FP31, FP32, FP41, FP420), respectively.

Figure 3:
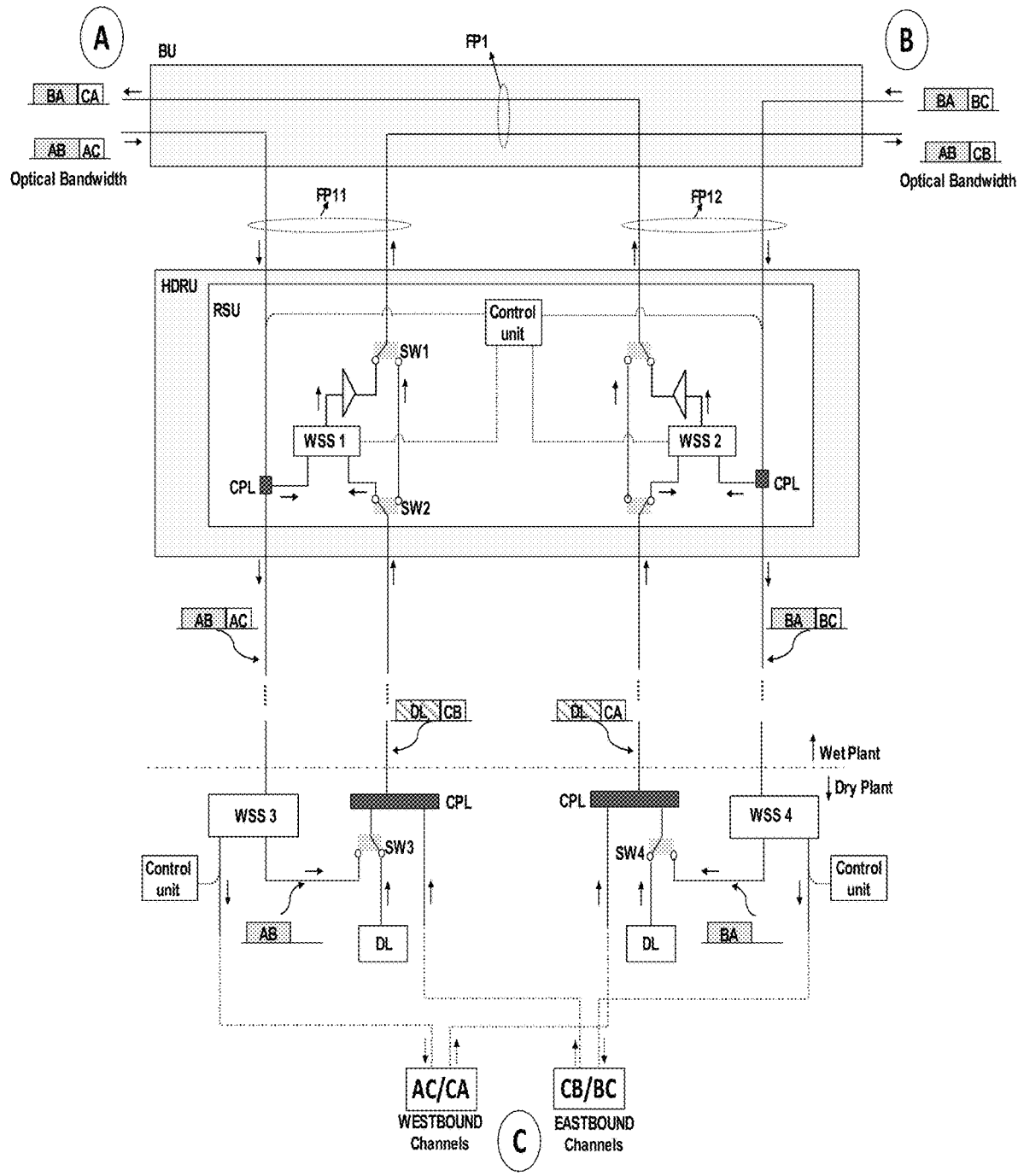
FIG. 3 is a schematic diagram of an illustrative HD-RSU configuration with remote WSS redundancy in which the configuration is in a normal-mode of operation according to aspects of the present disclosure.
Figure 4:
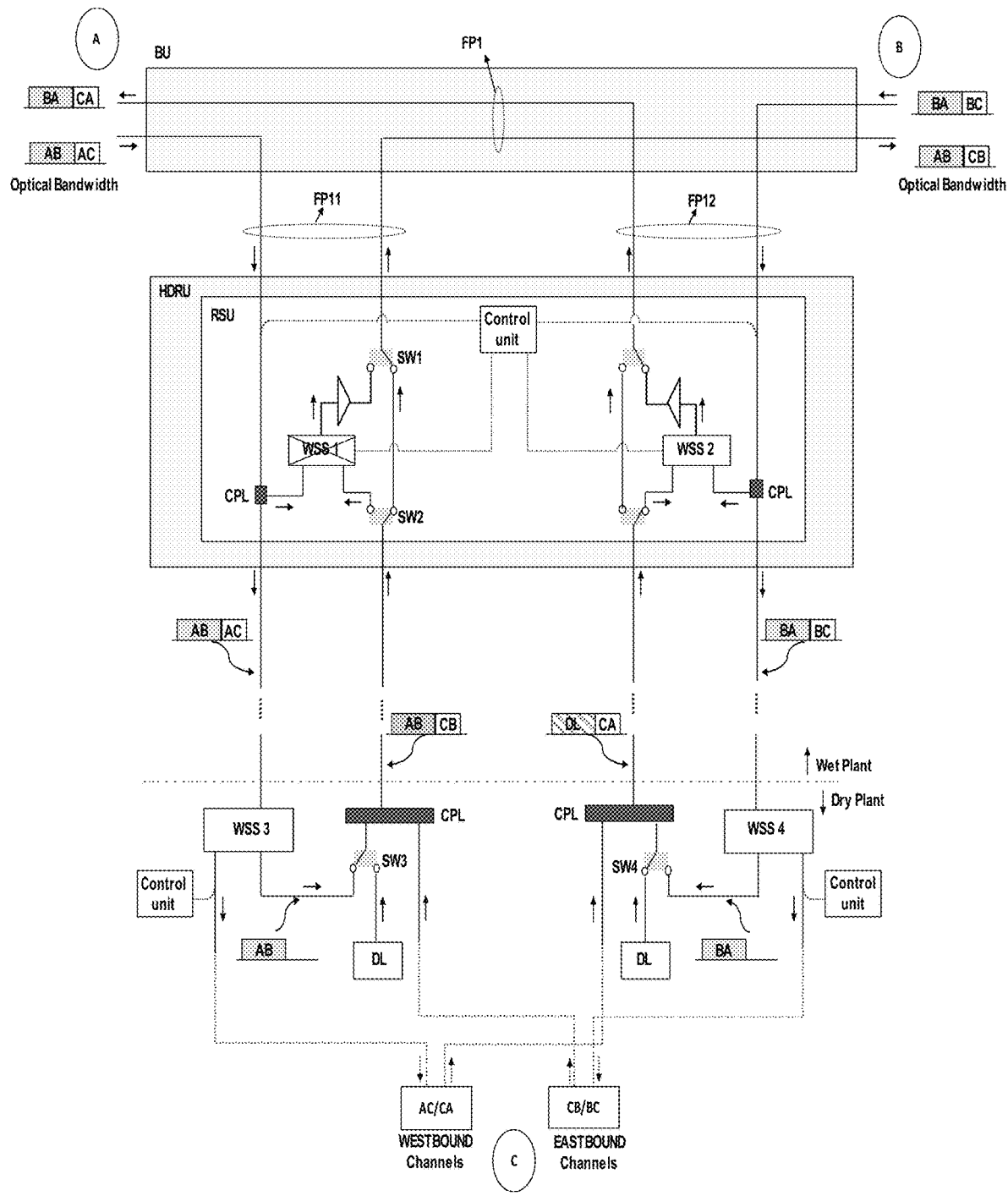
FIG. 4 is a schematic diagram of an illustrative HD-RSU configuration with remote WSS redundancy in which the configuration is in a failure-mode operation according to aspects of the present disclosure.

FIG. 3 is a schematic diagram of an illustrative HD-RSU configuration with remote WSS redundancy in which the configuration is in a normal-mode of operation according to aspects of the present disclosure. FIG. 4 is a schematic diagram of an illustrative HD-RSU configuration with remote WSS redundancy in which the configuration is in a failure-mode operation according to aspects of the present disclosure.

With simultaneous reference now to those figures, we note that for clarity and simplicity in this discussion, operation is described for one direction only, Those skilled in the art will of course recognize and understand that bi-directional operation will likewise operate.

As shown in these figures, three (3) stations are illustratively shown. Consistent with our simplified discussion, traffic from station A to station B (AB), traffic from station A to station C (AC), and traffic from station C to station B (CB) is explained. As noted, explanation(s) for traffic (BA), (BC), and (CA) are identical to that explained and described herein.

With specific reference to FIG. 3, it is noted that during a normal operation, WSS1 unit manages add/drop channels in typical/conventional ROADM operation. The AC traffic is replaced by the CB traffic at WSS1. At the branch station—C, trunk and branch channels are separated by WSS3. One output port of WSS3 sends branch channels (AC) to a corresponding transponder of AC/CA channels. A second port of the WSS3 sends trunk channels (AB) to an optical switch SW3. Alternatively, CB traffic is generated at station C and combined with Dummy Lights (DL) through a passive coupler. The Dummy lights are finally removed at WSS1, where AB traffic is combined to CB traffic.

Turning now to FIG. 4, there it shows a failure-mode operation according to aspects of the present disclosure when—for example—WSS1 fails. With reference to that figure, when WSS1 becomes non-operational, control unit at RSU issues a notification through an out-of-band channel using FP11. At branch station C, this notification is received through another control unit and optical switch SW3 is activated to change its condition. Now, instead of the dummy lights, trunk traffic is coupled to branch traffic. Simultaneously, optical switches SW1 and SW2 modify their condition after notification of WSS1 failure.

As may be observed from this figure, the illustrative configuration shown therein preserves a same end-to-end connectivity as with the normal-mode—with the exception that trunk channels now perform a round trip from the RU to the branch station. This causes an OSNR degradation of this channels that can be considered at a design stage as repair margin condition. This OSNR is recovered when the RU is replaced by a spare RU unit.

Those skilled in the art will now understand and appreciate that by employing our remote redundancy design/configuration according to aspects of the present disclosure, the number of WSS units in RSUs can be halved and the number of RSUs in the RU can be doubled, which results in significant advantages in terms of cost and submarine/undersea installation and operations.

At this point, while we have presented this disclosure using some specific examples, those skilled in the art will recognize that our teachings are not so limited. Accordingly, this disclosure should be only limited by the scope of the claims attached hereto.

The invention claimed is:
1. A submarine/undersea communications system configuration for communicating in a submarine/undersea transmission network comprising:

a submarine/undersea branching unit (BU);
a submarine/undersea reconfigurable optical add/drop multiplexer (ROADM), said ROADM including a plurality of ROADM sub-units (RSUs), each individual one of said plurality of RSU having a plurality of wavelength selective switches (WSS) in optical communication with said BU;
the submarine/undersea communication system configuration CHARACTERIZED BY:
remote redundancy of the plurality of RSU WSS;
wherein the remote redundancy of the plurality of RSU WSS is achieved by providing and configuring a redundant WSS for each individual one of the plurality of WSS included in the submarine/undersea RSU, each redundant WSS being located in a non-submarine/undersea location;
wherein each redundant WSS is configured to provide dummy signaling during normal operation to the individual one WSS in the submarine/undersea RSU for which it is redundant;
wherein each redundant WSS is configured to disable providing dummy signaling to the individual one WSS in the submarine/undersea RSU for which it is redundant, during a failure of the individual one WSS;
wherein each redundant WSS is configured to add/drop channels instead of the individual one WSS in the submarine/undersea RSU for which it is redundant during a failure of the individual one WSS.

* * * * *